United States Patent [19]

Möring

[11] 4,250,944
[45] Feb. 17, 1981

[54] PROCESS FOR PERFORMING ALUMINOTHERMIC RAIL CONNECTION WELDINGS AS WELL AS MULTIPART CASTING MOLD FOR PERFORMING THE PROCESS

[75] Inventor: Wilfried Möring, Essen, Fed. Rep. of Germany

[73] Assignee: Elektrothermit GmbH, Fed. Rep. of Germany

[21] Appl. No.: 43,498

[22] Filed: May 29, 1979

[30] Foreign Application Priority Data

Jun. 8, 1978 [DE] Fed. Rep. of Germany ....... 2825139

[51] Int. Cl.³ .................... B22D 23/00; B22D 19/04
[52] U.S. Cl. .................... 164/54; 164/108; 164/135; 249/86
[58] Field of Search .......... 164/54, 135, 108; 249/86

[56] References Cited

U.S. PATENT DOCUMENTS

| 2,977,651 | 4/1961 | Boutet | 164/54 |
| 3,189,959 | 6/1965 | Ahlert et al. | 164/54 |
| 3,620,291 | 11/1971 | Delachapelle | 164/54 |

FOREIGN PATENT DOCUMENTS

| 1270572 | 7/1961 | France | 164/54 |
| 22077 | 1/1930 | Netherlands | 164/54 |

Primary Examiner—Gil Weidenfeld
Assistant Examiner—K. Y. Lin
Attorney, Agent, or Firm—James E. Bryan

[57] ABSTRACT

This invention relates to an improvement in the process for performing aluminothermic rail connection weldings, in which the rail ends to be welded together and being laid with a gap are enclosed with a fireproof, prefabricated casting mold producing a weld reinforcement covering the gap, and aluminothermically-produced steel is poured into the casting mold cavity, the improvement comprising pouring the steel melt into the casting mold in the form of at least two separate casting streams positioned opposite each other in the longitudinal rail direction, whereby the casting streams are so guided that they will intermix approximately in the area of the rail head center of the two rails to be welded together. The invention also relates to a casting mold for performing the process.

3 Claims, 6 Drawing Figures

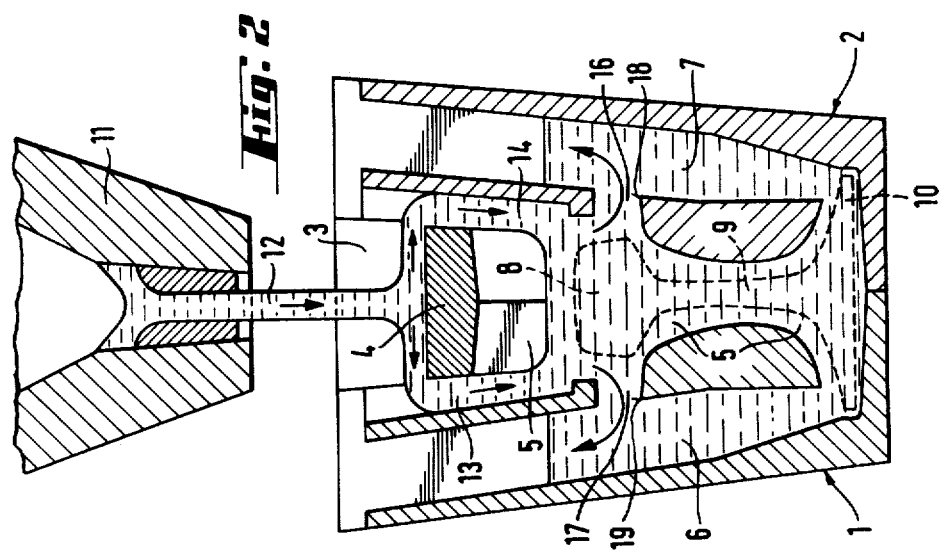
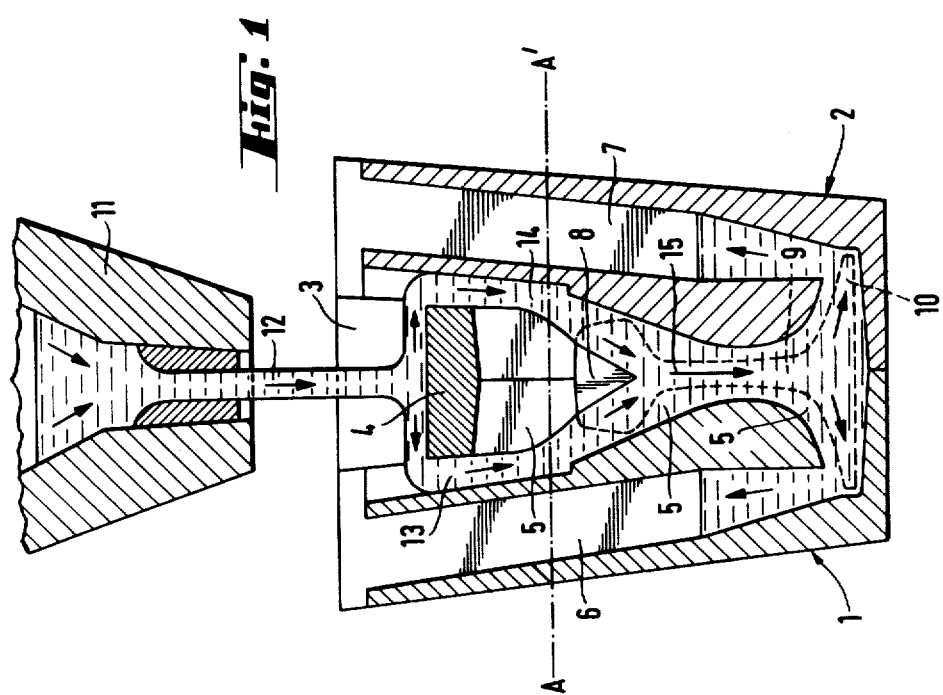

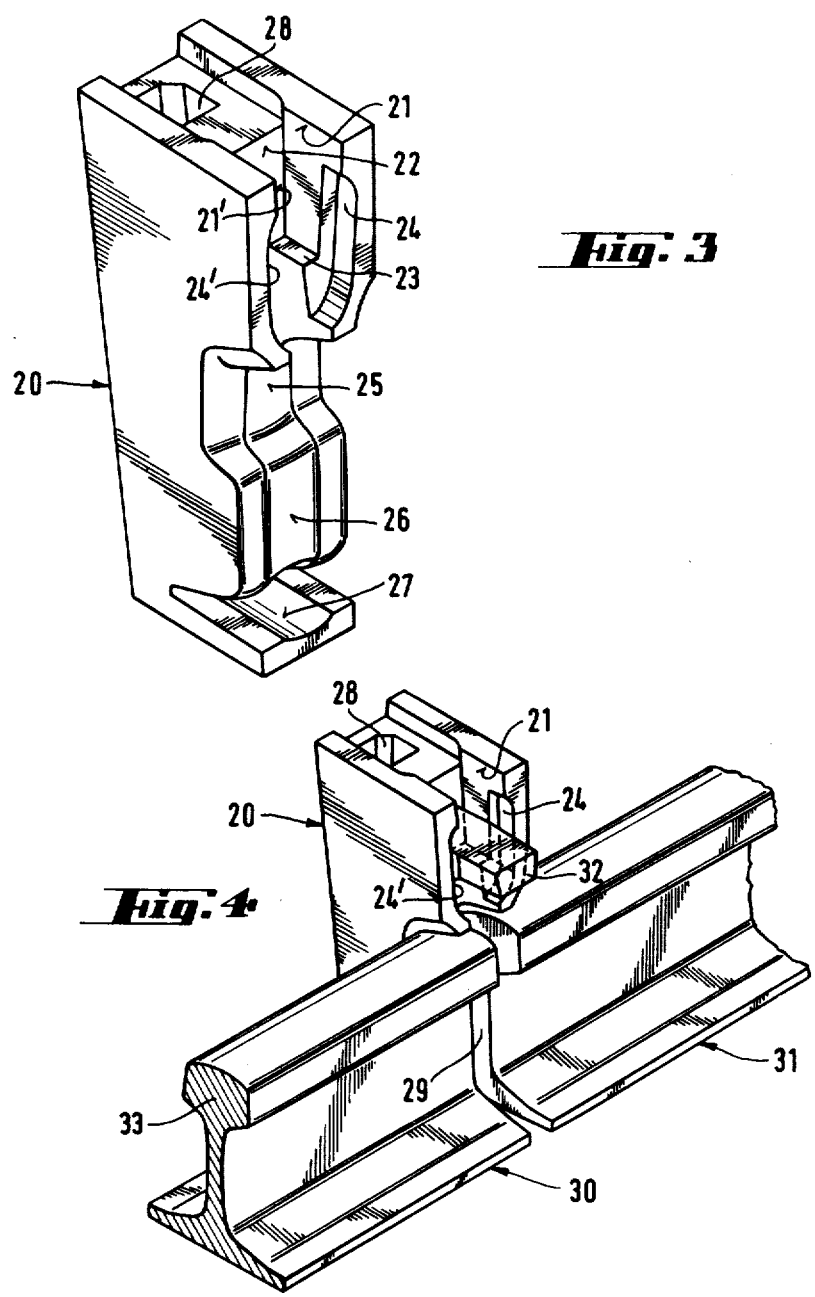

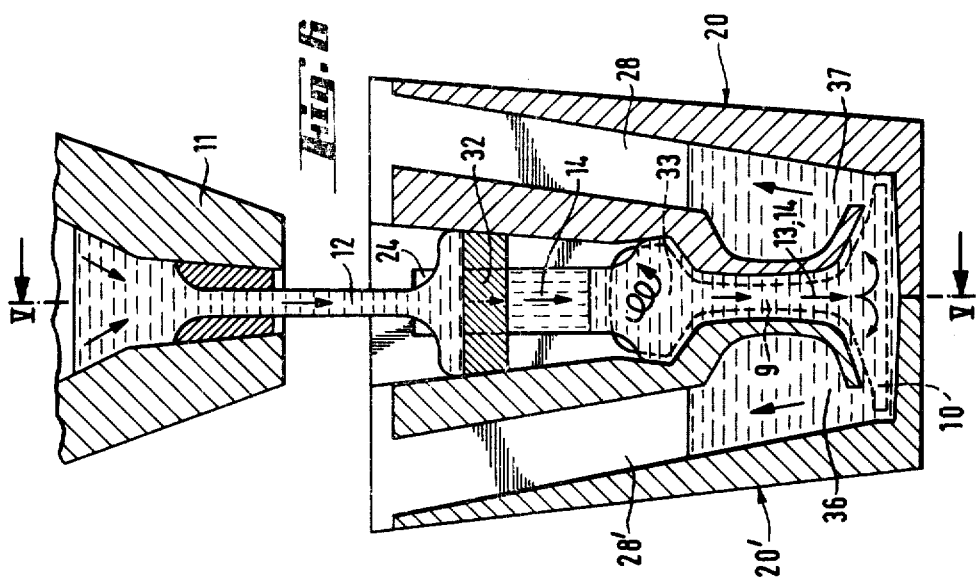
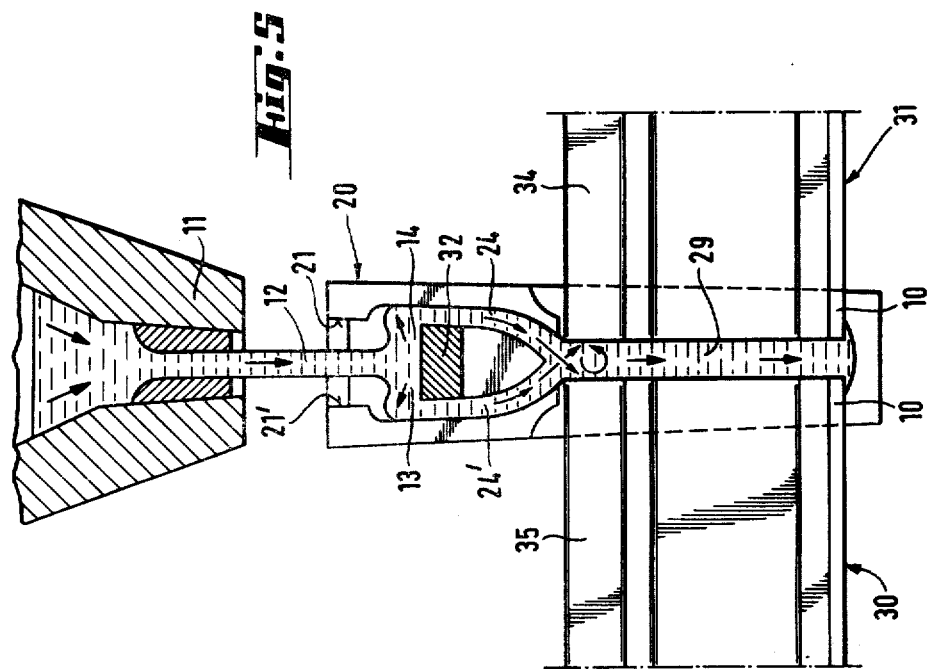

PROCESS FOR PERFORMING ALUMINOTHERMIC RAIL CONNECTION WELDINGS AS WELL AS MULTIPART CASTING MOLD FOR PERFORMING THE PROCESS

The present invention relates to a process for performing aluminothermic rail connection weldings in which the rail ends to be welded together and being arranged with a gap therebetween are surrounded by a fireproof, prefabricated casting mold producing a weld reinforcement covering the gap, and in which aluminothermically-produced steel is poured into the casting mold cavity.

The present invention further relates to a multipart, preferably two-part casting mold for performing the inventive process.

In aluminothermic rail connection welding, the ends of two rails placed down with a fixed gap are enclosed with a multipart casting mold. Customarily the rail ends and the assembled casting mold, which is generally, sealed laterally with plastic refractory clay, are preheated from above with the aid of a burner. Then, the rail ends are melted down by pouring an aluminothermically-produced steel charge into the mold, and are thereby bonded to each other. Such a procedure has been known for many years and is widely used. From among the numerous descriptions of the process, only one is referred to herein specifically, namely the publication in the periodical "Der Eisenbahningenieur" (The Railroad Engineer), 1973, pages 89 to 94.

In the course of this process, the heat requirement needed for the welding is met at varying percentages from the preheating step by means of the burner flame, and the excess heat of the liquid welding material which is given off to the two rail ends partially during its flowing past the rail profile during casting, and partially during the cooling thereof in the welding gap after the casting. Also known in the art are processes in which the required heat is supplied solely by the liquid aluminothermically-produced welding material.

The dimensions of the intermediate casting, and hence of the casting mold, are determined by the profile of the rails to be welded together, if desired by the flow-technical guide of the preheating flame while taking into account the preheating duration, and particularly by the casting technique and the heat-technical guide of the casting flow along the profile.

In all of the known aluminothermic intermediate cast welding processes, the casting or pouring of the melting material into the welding gap takes place by means of correspondingly provided mold parts at a right angle to the longitudinal rail axis. This has the disadvantage that the welding material—within the profile cross-section varying greatly over the head, web, and foot of the rail—will choose the flow-technically most favorable path, and that parts of the rail profile are initially not contacted and are not heated or are only insufficiently heated. This is true particularly for the flow around and the heating of the rail head, for the heating of which a particularly large amount of heat is required because of its large mass opposite the web and foot.

In order to nevertheless sufficiently heat the rail head, the weld reinforcements and the so-called heat risers must be kept relatively large so as to supply the required heat. As a result thereof, however, there also takes place an increased melting down of the rail head at the outer contours thereof, whereas the melting down in the rail head interior takes place by contrast to a lesser extent. The heat-influenced softer zones within the rail steel being present on both sides of the finished weld then may under certain circumstances lie apart to such a degree that in the most unfavorable of cases they can be individually extended by the rolling wheel.

It is the object of the present invention to so improve the heat guidance in aluminothermic rail connection welding, particularly in the head region, that the center of the rail head is better melted down and the heat influencing of the rail head center, the rail head tread, and the rail head outer surfaces are better coordinated with respect to each other.

Surprisingly, this is successfully achieved in that the steel melt is poured into the casting mold cavity in the form of at least two separate casting streams positioned opposite each other in the longitudinal rail direction, whereby the casting streams are so guided that they will intermix approximately in the area of the rail head center of the two rails which are to be welded together.

In contrast to the state of the art, therefore, the pouring-in of the melting material into the welding gap does not take place transversely to the longitudinal rail axis, but in the longitudinal rail axis in the direction toward the two rail head sectional areas. In this connection, the casting streams are so guided that they will impinge upon each other approximately within the area of the rail head center of the two rails to be welded together. At that time, there takes place a vorticity of the two casting streams within the area of the rail head, whereby a reliable heating and melting down of the rail heads, that is preferably in the rail head center, is effectively achieved. The combined casting streams will then, during the further pouring-in of the aluminothermically-produced steel melt, further fill the casting mold cavity and, after totally filling the casting mold cavity, rise into the riser channels.

In this connection, it is a particular advantage of the inventive process that the soft annealing zones on both sides of the finished weld will draw closer together so that any driving out which sometimes does occur in the rail operation can be avoided.

This form of the inventive guidance of the casting streams additionally permits, in dependence upon the existing rail profiles, a reduction of the gap width needed for the welding so that the narrow points of lower hardness in the soft annealing zones of the welded rails are positioned even more closely together, which is of particular advantage for the rail operation.

The inventive process is carried out preferably with a casting mold which is equally an object of the present invention. It is a multipart, particularly two-part, casting mold, whereby the assembled mold over the rails forms a pouring-in pot which terminates in a casting mold cavity, which encloses the rail ends, and whose inner walls define the weld reinforcements, whereby the casting mold cavity in the rail foot area is in connection with riser channels for receiving the excess steel melt, and including a bar positioned on shoulders of the pouring-in pot.

According to the present invention, in the multipart casting mold casting channels are molded into the walls of the pouring-in pot, these walls being positioned opposite each other and transversely to the longitudinal rail direction, whereby the oppositely-positioned casting channels in the lower area of the pouring-in or casting pot while progressively deviating from the vertical will so run toward each other that the streams of molten metal being guided thereby will impinge upon each other and be intermixed approximately in the area of the rail head center of the two rails to be welded together, whereby the casting mold cavity surrounding the rail ends is in connection with the riser channels only within the rail foot area, and the casting bar—leaving free only the casting channels present in the pouring-in pot—is adapted to be inserted or placed into the pouring-in or casting pot.

By means of the bar present in the pouring-in or casting pot, the steel melt is forced to flow into the casting mold cavity through the casting channels which are molded into the walls of the pouring-in or casting pot, which walls are located transversely to the longitudinal rail direction. These oppositely-positioned casting channels extend in the lower area of the pouring-in or casting pot toward each other in a curve-like manner. Due to the curved shape of the casting channels, the steel melt streams flowing in through the casting channels impinge upon each other approximately in the area of the center of the respectively oppositely-positioned rail head ends and produces vortices during the impingement upon each other, whereby a particularly good melting-down and rinsing effect in the area of the respective rail head center is effectively produced.

In order to insure and improve the heating and melting down of the oppositely-positioned rail ends in the lower web and in the foot area, in a further embodiment of the inventive casting mold the riser channels in the rail foot and in the adjacent web area have a one-sided bulge corresponding to the rail form or shape.

Due to the widening of the riser channel corresponding to the rail form or shape in the rail foot and the adjacent web area, a greater amount of the steel melt is collected there which, during filling of the mold as well as thereafter during the solidifying of the steel, gives off a correspondingly large heat quantity into the neighboring rail foot and web area.

The inventive process will be further illustrated by reference to the accompanying drawings, in which:

The state of the art is indicated in FIGS. 1 and 2, and the present invention is shown in FIGS. 3 to 6.

FIG. 1 herein is a cross-sectional view through a two-part mold assembled around a rail transversely to the longitudinal rail axis in the area of the rail gap;

FIG. 2 illustrates a modified mold of the state of the art, equally in a cross-sectional view transversely to the longitudinal rail axis;

FIG. 3 illustrates a mold half of a two-part inventive mold;

FIG. 4 illustrates two track sections being placed down with a gap into which one mold half of the two-part inventive mold is placed and into which the casting bar is placed.

The inventive casting mold is illustrated in FIG. 5, whereby, however, the mold composed of two mold halves is cut in the longitudinal rail direction.

FIG. 6 illustrates the casting mold in a cross-section transversely to the longitudinal rail direction.

In FIG. 1, the two casting mold halves are identified with reference numerals 1 and 2. They form in the upper area a pouring-in or casting pot 3 into which a bar 4 is inserted. The casting mold cavity is identified with reference numeral 5. To that belongs also the cavities which define the weld reinforcements in the finished weld. The riser channels are identified with the reference numerals 6 and 7. Because the section has been made through the welding gap, one views the end face of one of the rail ends to be welded together with the head 8, the web 9, and the foot 10. The aluminothermically-produced steel is molten in a crucible 11 situated above the pouring-in or casting pot 3 and then flows as a stream or jet 12 into the pouring-in or casting pot 3, whereby the stream or jet 12 impinges upon the bar 4 and is divided into the casting streams 13 and 14 which run into the casting mold cavity 5 and will therein flow around the rail head. The arrows indicate the path of the casting streams. It is apparent that the outer areas or regions of the rail head are more vigorously flowed about than the center of the rail head. The casting streams 13 and 14 combine into one casting stream 15 in the area of the narrowing of the casting mold cavity 5 which corresponds to the diameter of the rail web as well as to that of the reinforcements to be produced, will fill the rail foot portion of the casting mold cavity, and then rise into the riser channels 6 and 7. At the time of the completed casting process, the steel melt is approximately at the height of the drawn-in line A—A'.

A variant of a casting mold according to the state of the art is shown in FIG. 2. The two casting mold halves are again identified with reference numerals 1 and 2. In this particular casting mold, the connecting channels 16, 17 are approximately at the height of the rail head. These connecting channels 16, 17 have the effect that after a filling of the casting mold cavity with steel melt up to the lower edge 18, 19 of the connecting channels 16, 17, the casting streams are no longer forced to stream through the casting mold cavity in the area of the rail web and foot. Rather, they are guided directly around the rail head 8 and past the rail head 8 through the connecting channels 16, 17 into the riser channels 6, 7. By means of the construction one does achieve that the last portion of the melt flowing in at a high temperature remains directly in the area of the rail head and melts it down. It is, however, disadvantageous that particularly the outer regions of the rail head 8 are heated more intensely than the area of the rail head center, and that an additional supply of fresh and correspondingly hotter steel into the web and foot area or zone will no longer take place. Thus, the object of the present invention is also not obtained by such a construction.

In FIG. 3, one half of the inventive two-part casting mold is identified with reference numeral 20. Half of the pouring-in or casting pot is formed by the inner wall 21, the corresponding oppositely-positioned inner wall 21' which is not visible and the wall 22 being provided at a right angle with respect thereto. Disposed in the lower part of the pouring-in or casting pot at the inner wall 21 is a projection or shoulder 23 upon which a casting bar may be placed. Molded into both the wall 21 of the pouring-in or casting pot and the oppositely-positioned wall 21' is, respectively, one casting channel 24, 24' which in the lower area thereof extends in a curve-like manner with respect to the longitudinal sectional plane of the casting mold 20. The walls 25, 26, and 27 delimit the casting mold and define the width and thickness of the weld reinforcements. The upper opening of the riser channel in the casting mold is identified with reference numeral 28.

Illustrated in FIG. 4 are two track pieces 30, 31 placed down with a gap 29, whereby for the purpose of a clearer representation only one mold half 20 in the gap area 29 is shown. The bar 32 is inserted into the pouring-in or casting pot. A casting stream or jet running from above into the pouring-in or casting pot flows through the casting channel 24, and the casting channel 24' positioned opposite the channel 24, into the casting mold cavity and is then forcibly guided to the rail head center 33 due to the specific guide of the casting channels 24, 24'.

FIG. 5 is a cross-sectional view through the inventive casting mold in the longitudinal rail direction and shows the path of the casting streams. Again produced in the crucible 11 by means of an aluminothermic reaction is a steel melt and, after the completion of the reaction and floating of the slag having been formed, the steel melt is tapped. The casting stream or jet 12 impinges upon the bar 32 which is placed into the mold half 20. In contrast to the state of the art, the casting streams 13, 14 will now run through the casting channels 24, 24' into the casting mold cavity and impinge upon each other approximately in the area of the center of the two rail heads disposed at a distance from each other. During this impingement there takes place an intensive intermixing of the casting jets, as illustrated by arrows, which effect in the area 34, 35 of the rail heads an intensive heat radiation. The combined casting streams now fill the casting mold cavity and stream to the rail foot 10 and will then fill the riser channels, which have not been shown in the figure.

FIG. 6 illustrates the inventive casting mold in a cross sectional view thereof taken transversely to the longitudinal rail direction. Visible therein are the casting mold halves 20, 20' as well as the bar 32 in the pouring-in or casting pot. The casting jet 12 impinges upon the bar 32 and flows into the casting channel 24. Because of the choice of the sectional plane, only one of the two casting channels is illustrated. Within the area of the rail head center 33, the two casting streams 13, 14 are whirled about, but only the casting stream 14 is graphically representable. The combined casting streams 13, 14 then fill the casting mold cavity and the excess steel melt rises into the riser channels 28, 28'.

Illustrated at the same time in FIG. 6 is a preferred embodiment of the inventive mold. The riser channels 28, 28' have in the foot 10 and web 9 areas the bulges 36, 37. This has the result that the rail web 9 and the rail foot 10 are charged with a correspondingly large heat quantity so that a reliable melting down and melting together of the rail ends in this area will effectively take place.

It will be obvious to those skilled in the art that many modifications may be made within the scope of the present invention without departing from the spirit thereof, and the invention includes all such modifications.

What is claimed is:

1. In the process for performing aluminothermic rail connection weldings, in which the rail ends to be welded together and being laid with a gap are enclosed with a fireproof, prefabricated casting mold producing a weld reinforcement covering the gap, and aluminothermically-produced steel is poured into the casting mold cavity, the improvement comprising pouring the steel melt into the casting mold in the form of at least two separate casting streams positioned opposite each other in the longitudinal rail direction, whereby the casting streams are so guided that they will intermix approximately in the area of the rail head center of the two rails to be welded together.

2. In a multipart casting mold for performing aluminothermic rail connection weldings in which the assembled mold forms a casting pot over a pair of rail ends to be welded, said casting pot terminating in a casting mold cavity which encloses said rail ends and the inner walls of said mold cavity defining weld reinforcements, said casting mold cavity in the rail foot area being in connection with riser channels for receiving excess steel melt, and a bar adapted to be positioned on shoulders in said casting pot, the improvement comprising casting channel means in opposite walls of said casting pot in the longitudinal rail direction, said channel means deviating from the vertical and toward each other in a manner such that streams of molten metal guided in said channels will impinge upon each other and intermix approximately in the area of the rail head center of said rail ends to be welded, and means whereby said casting mold cavity is in connection with said riser channels only in the rail foot area.

3. A casting mold according to claim 2 including a one-sided bulge in said riser channels in the rail foot and adjacent web areas corresponding to the rail shape.

* * * * *